United States Patent [19]

Barron et al.

[11] Patent Number: 4,876,717

[45] Date of Patent: Oct. 24, 1989

[54] ADJUNCT PROCESSOR FOR PROVIDING COMPUTER FACILITY ACCESS PROTECTION VIA CALL TRANSFER

[75] Inventors: Salvador Barron, Westminster; James E. Coffman, Boulder, both of Colo.

[73] Assignees: American Telephone and Telegraph Company; AT&T Information Systems, Morristown, N.J.

[21] Appl. No.: 205,054

[22] Filed: Jun. 3, 1988

Related U.S. Application Data

[63] Continuation of Ser. No. 913,288, Sep. 30, 1986, abandoned.

[51] Int. Cl.⁴ .............................................. H04L 9/00
[52] U.S. Cl. ........................................ 380/25; 380/49; 379/95; 340/825.31; 340/825.34
[58] Field of Search .......................................... 380/3-5, 380/24, 47, 49, 50; 379/95; 340/825.31, 825.34

[56] References Cited

U.S. PATENT DOCUMENTS

| | | | |
|---|---|---|---|
| 3,806,882 | 4/1974 | Clarke | 364/200 |
| 3,896,266 | 7/1975 | Waterbury | 235/380 |
| 3,984,637 | 10/1976 | Caudill et al. | 179/2 DP |
| 4,096,356 | 6/1978 | Burtness et al. | 179/18 |
| 4,182,933 | 1/1980 | Rosenblum | 179/1.5 R |
| 4,415,767 | 11/1983 | Gill et al. | 381/51 |
| 4,430,728 | 2/1984 | Beitel et al. | 179/2 DP |
| 4,475,175 | 10/1984 | Smith | 178/22.08 |
| 4,479,122 | 10/1984 | Redman et al. | 340/825.31 |
| 4,520,233 | 5/1985 | Smith | 179/1.5 R |
| 4,531,023 | 7/1985 | Levine | 179/2 DP |
| 4,532,377 | 7/1985 | Zink | 379/94 |
| 4,604,499 | 8/1986 | Hughes | 179/2 DP |

OTHER PUBLICATIONS

J. T. Powers, Jr., "Switched Lines Access Restrictor", IBM Technical Disclosure Bulletin, vol. 22, No. 9, Feb., 1980, pp. 4196-4197.
J. Smith, "Call-Back Schemes Ward Off Unwanted Access by Telephone", 8032 Electronics International, 57(1984)Mar., No. 5, N.Y., U.S.A., pp. 131-135.
C. W. Beardsley, "Is Your Computer Insecure?", IEEE Spectrum, vol. 9, No. 1, Jan. 1972, pp. 67-78.

*Primary Examiner*—Stephen C. Buczinski
*Assistant Examiner*—Bernarr Earl Gregory
*Attorney, Agent, or Firm*—Ross T. Watland

[57] ABSTRACT

This adjunct processor arrangement performs a centralized call screening function to provide computer port access security. Every call origination in the telephone switching system from a calling party to a protected computer port is interdicted by the telephone switching system and routed to the adjunct processor. The calling party receives a series of prompts from the adjunct processor to provide identification information, such as login, password, and voiceprint information. The adjunct processor validates the identity of the calling party using this identification indicia and initiates a callback operation. The adjunct processor disconnects the calling party from the connection, calls the calling party back and then uses the data call transfer capability of the telephone switching system to connect the calling party to the computer.

14 Claims, 2 Drawing Sheets

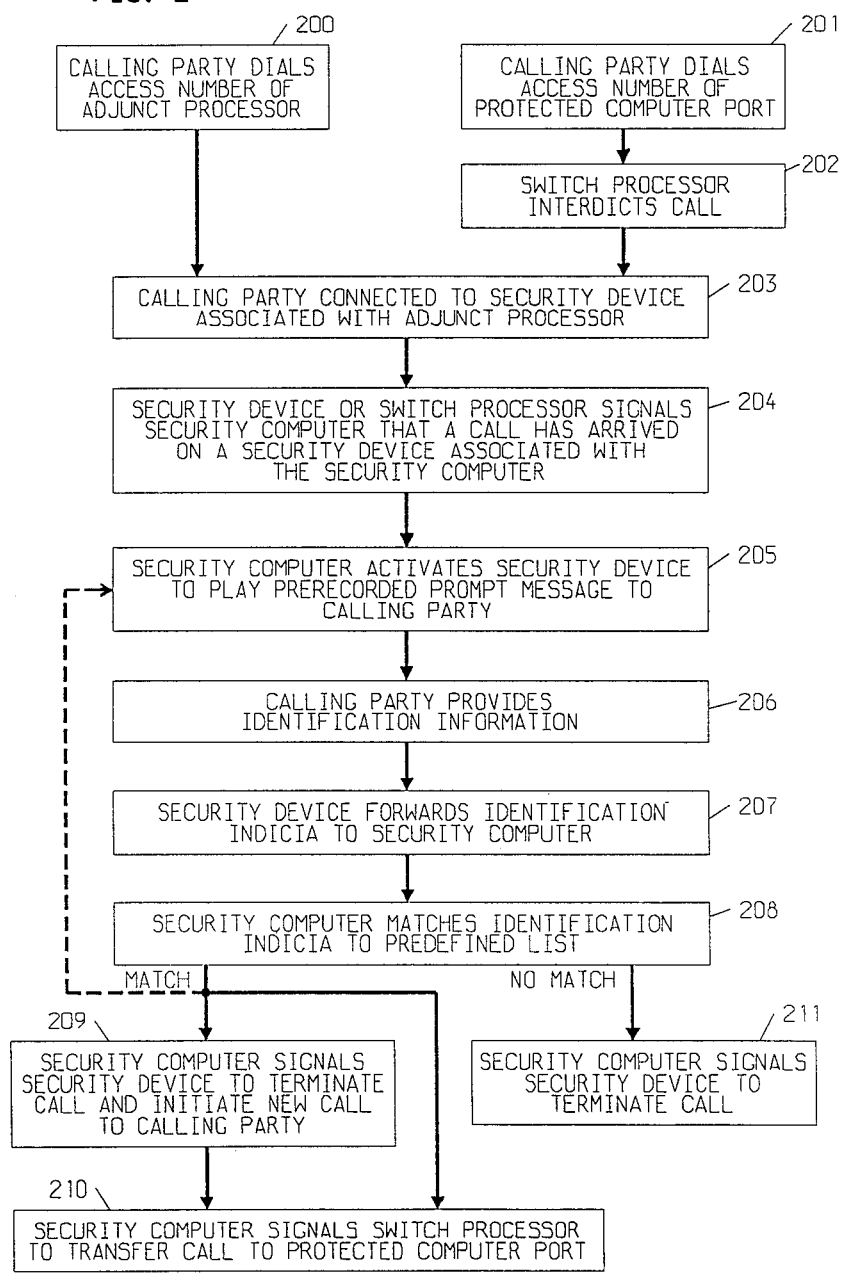

ADJUNCT PROCESSOR FOR PROVIDING COMPUTER FACILITY ACCESS PROTECTION VIA CALL TRANSFER

This application is a continuation of application Ser. No. 913,288, filed Sept. 30,1986, now abandoned.

FIELD OF THE INVENTION

This invention relates to business communication systems and, in particular, to an adjunct processor which provides computer facility access protection by way of the call transfer feature of the business communication system.

PROBLEM

It is a problem in dial-up type computer systems to prevent the unauthorized access of computer facilities. A common method of providing relatively secure access protection for a computer system is to equip each computer port with a callback unit. A callback unit is a device connected between a telephone line and a computer port to limit access to the computer to only those users having the proper authorization. A calling party dials the access number of the computer port and is connected by the business communication system to the callback unit. The callback unit prompts the calling party to provide the proper password and user identification information which is used by the callback unit to validate the identity of the calling party as an authorized user of the computer facility. The callback unit reviews a list of authorized users stored in the callback unit memory to determine whether the password sequence entered by the calling party matches the list of authorized users. If a match occurs, the callback unit reads the telephone number associated with the calling party from the list. The callback unit then disconnects the calling party from the computer port and initiates an outgoing call from the computer port to the calling party at the predesignated telephone number. The calling party responds to this call from the callback unit by going off hook on the telephone station set or computer terminal and is cut through by the callback unit to the computer port. The callback unit remains connected in series between the calling party and the computer port for the duration of the call.

The problem with this arrangement is that every computer port must be equipped with a callback unit in order to obtain the required level of security. These callback units are relatively expensive and the cost to the customer to protect a computer center which serves numerous computer ports is prohibitive. More sophisticated personnel identification equipment, such as voiceprint identifiers, would provide a significantly improved level of security for the computer system, but to equip each callback unit with such equipment renders the cost of security beyond the reach of almost every computer system manager. Solution This problem is overcome and a technical advance achieved by the subject adjunct processor that provides computer facility access protection via the data call transfer capability of the business communication system. This adjunct processor arrangement performs a centralized call screening function to provide computer facility access security. Every call origination in the business communication system from a user to a protected computer facility is interdicted by the business communication system and routed to the adjunct processor. The user receives a series of prompts from the adjunct processor to provide identification information, such as login, password, and voiceprint information. The adjunct processor validates the identity of the user using this identification indicia and initiates a callback operation. The adjunct processor disconnects the user from the call connection, calls the user back and then uses the data call transfer capability of the business communication system to connect the user to the computer facility. The adjunct processor releases from the call connection and is available to screen another calling party. In this fashion, extensive and expensive security facilities, such as voiceprint identification apparatus, can be provided in the centralized adjunct processor to give the users a very high level of security since the cost of these security facilities is distributed over all of telephone switching system users.

In a large business communication system, there can be numerous computer facilities served by the business communication system. These computer facilities can be mainframe computers, each of which is equipped with a plurality of access ports, or personal computers, each of which is connected to an individual user's telephone line in conjunction with the user's telephone station set. In the case of the personal computers, the cost of security quickly becomes prohibitive due to the large number of computer facilities in contrast with large mainframe computers each served by only a small number of access ports.

The adjunct processor security arrangement of the present invention provides a centralized call screening function. The calling party dials either the adjunct processor or the access number of a computer port. In the former case, the calling party is directly connected through the switching network to the adjunct processor. In the latter case, the switch processor of the business communication system recognizes, for example through the class of service associated with this dialed number, that the destination identified by the dialed number is a protected computer facility. The switch processor ignores the number dialed by the calling party and connects the calling party directly through the switching network to the adjunct processor. The switch processor transmits control messages to the adjunct processor identifying the calling party, the dialed number as well as any other relevant information about the protected computer facility.

The adjunct processor provides a series of standardized prompts to the calling party to elicit password and calling party identification information. This information can be as simple as a multiple character password typed on a computer terminal keyboard or can be as sophisticated as a voiceprint obtained from the calling party over the communication connection. The calling party identification information is used by the adjunct processor to validate the identity of the calling party.

Once the calling party has been identified, the adjunct processor scans a list of authorized users stored in an adjunct processor memory to retrieve from memory a predesignated telephone number assigned to this calling party. The adjunct processor disconnects the calling party from the call connection and initiates a new data call connection from the adjunct processor to the predesignated number associated with the calling party. The business communication system completes this data call connection to the calling party from the adjunct processor. The adjunct processor, in response to the completion of a data call connection, initiates a standard data call transfer operation. The adjunct processor signals the switch processor to indicate the identity of the protected computer facility to which the calling party is requesting access as well as the port on the adjunct processor to which the calling party is presently connected. The switch processor disconnects the calling party from the adjunct processor and establishes a new switching network connection from the calling party to one of the port circuits associated with the protected computer facility designated by the number originally dialed by the calling party.

If the calling party is not at a predesignated location, the callback operation can be dispensed with and a simple data call transfer operation used to connect the calling party to the protected computer facility. This is useful in the case where the calling party accesses the protected computer facility from a remote location or from a location other than the predesignated location assigned to the calling party. The callback operation can also be dispensed with if the user identity validation is relatively foolproof, such as in the case of a voiceprint identification.

This centralized adjunct processor calling party screening apparatus provides a cost effective method to achieve a high level of security for all of the computer ports served by the business communication system. The data call transfer capability of the business communication system enables the adjunct processor to be disconnected from the call connection upon completion of the call screening operation. The adjunct processor can thereby serve a plurality of computer ports.

BRIEF DESCRIPTION OF THE DRAWINGS

These and other advantages of the invention may be better understood from a reading of the following description of one possible exemplary embodiment taken in conjunction with the drawing in which:

FIG. 2 illustrates, in flow diagram form, the method of operation of the subject adjunct processor for providing computer facility access protection.

DETAILED DESCRIPTION

Figure 1:
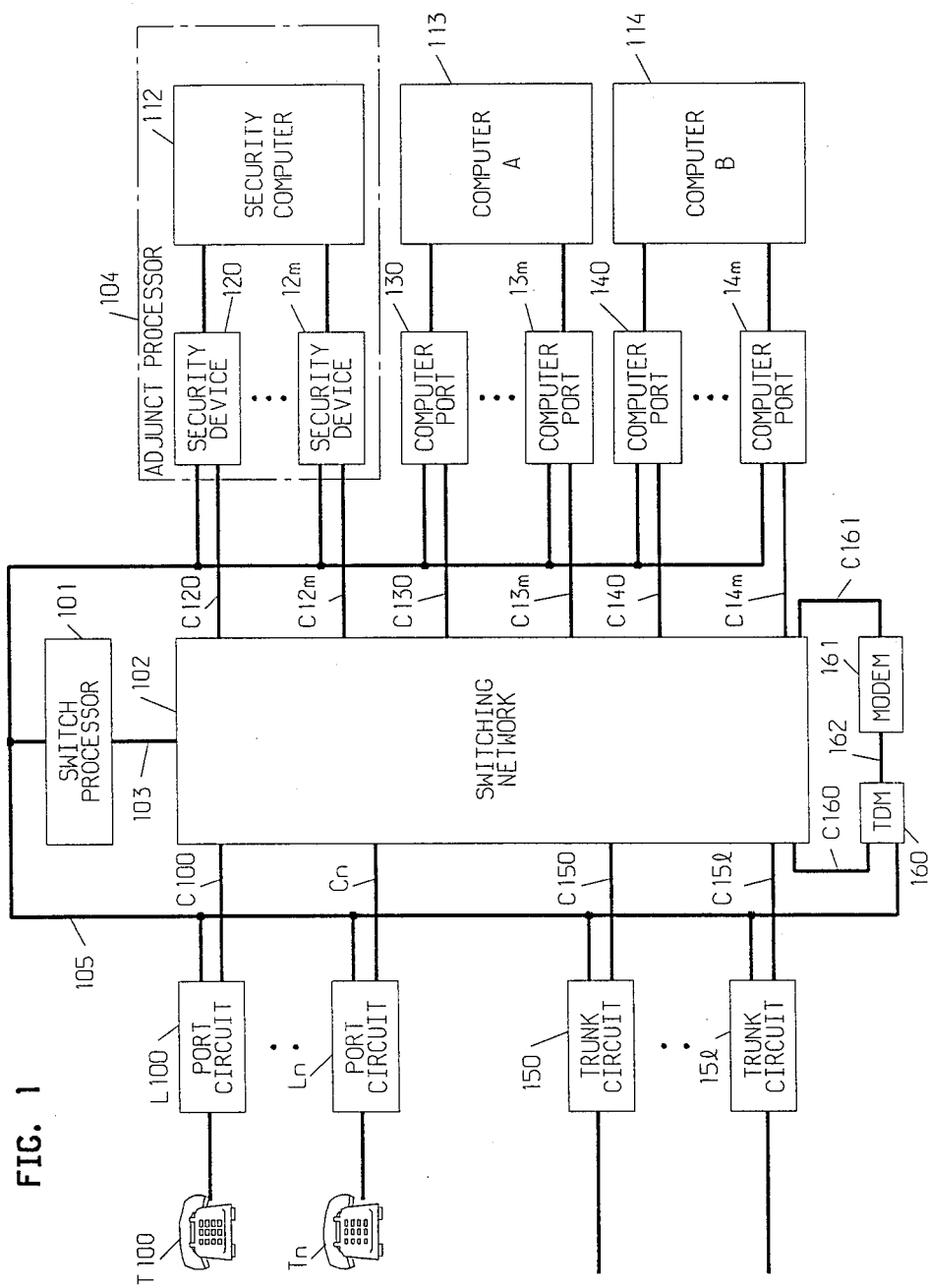
FIG. 1 illustrates, in block diagram form, the structure of both the subject adjunct processor for providing computer facility access protection and the associated business communication system.

FIG. 1 illustrates, in block diagram form, the adjunct processor for providing computer facility access protection as well as a business communication system in which it operates. The business communication system can be any one of a number of digital switching systems and, for the purpose of this description, is assumed to be an AT&T System 85 switch. FIG. 1 illustrates a plurality of terminal equipment T100-Tn each of which is associated with a respective one of the business communication system port circuits L100-Ln. This terminal equipment includes telephone station sets as well as digital terminal devices. The business communication system is also equipped with a plurality of trunk circuits 150-151 which interconnect the business communication system with the local telephone company central switching equipment. A number of computer facilities are also connected to the business communication system. These computer facilities include one or more general purpose computers (computer A, computer B) each of which is connected via a plurality of associated computer ports 130-13n, 140-14n to the business communication system. The business communication system includes a switching network 102, connected via communication leads C100-Cn to the port circuits L100-Ln, via communication leads C130C13m, C140-C14m to computer ports 130-13m, 140-14m, and via communications leads C150-151 to trunk circuits 150-151. Switch processor 101 is connected to all of the port circuits by bus 105, which functions to carry control signs between switch processor 101 and the port circuits (120-151, L100-Ln). Switching network 102 functions under the control of switch processor 101 to establish communication connections among the communication devices comprising the terminal equipment, trunk circuits and computers by interconnecting the associated port circuits. This business communication system is also equipped with modem devices (e.g., 161) associated with a trunk data module 160 which functions to convert the analog signals received from one of trunk circuits 150–151 to digital signals for use by one of the computer facilities 113–114.

ADJUNCT PROCESSOR

In addition to the above mentioned terminal equipment and computer facilities, the business communication system illustrated in FIG. 1 is connected to adjunct processor 104 to provide computer facility access protection. In this exemplary embodiment, adjunct processor 104 comprises security computer 112 connected to switching network 102 via a number of security devices 12012m and their associated communication leads C120-C12m. Adjunct processor 104 can comprise any of a number of device configurations as dictated by the need to provide a defined level of computer facility access security. For example, the desired level of security can require a simple login/password access. Alternatively, the desired level of security can be more stringent and require user identification via validation of some immutable physical characteristic of the user. Examples of such physical characteristic identification apparatus includes: fingerprint reader devices such as that manufactured by Identix Corp.; voiceprint identification algorithms; retina scan apparatus. The cost of such physical characteristic identification apparatus is high and, for the purpose of this description, it will be assumed that a combined login/password and voiceprint identification arrangement is provided in adjunct processor 104.

Assume for the purpose of this description that adjunct processor 104 is implemented by means of a security computer 112 connected via a plurality of security devices 120-12m and their associated communication leads C120-12m to switching network 102. Security computer 112 can be a personal computer such as the AT&T UNIX ™ PC which is equipped with voiceprint matching software. In addition, security computer 112 is equipped with a number of security devices 120-12m such as the AT&T DCPI card which, in this case, provides a simple digital interface between security computer 112 and switching network 102 via communication leads C120-12m and between security computer 112 and switch processor 101 via bus 105. Security devices 120-12m appear to switch processor 101 as port circuits serving a digital telephone station set. Security computer 112 has stored in memory, for example, a list of authorized computer users, the user's login/password identifiers, a sample of the user's voiceprint and a predetermined telephone number associated with the user's terminal device.

CALL SCREENING

Adjunct processor 104 functions to screen incoming calls to all the computer facilities served by the business communication system. This is accomplished in one of two ways. A calling party can directly call adjunct processor 104 via switching network 102 and one of security devices 120-12m. Alternatively, switch processor 101 interdicts each call originated by a calling party at a communication device (e.g., T100) to a protected computer facility (e.g., computer A). Switch processor 101 activates switching network 102 via signal path 103 to connect the calling party at communication device T100 to one of security devices 120-12m associated with adjunct processor 104.

Security computer 112, in conjunction with the security device (e.g., 120) connected to the calling party at communication device T100, determines the identity of the calling party by means of an exchange of password/login and voiceprint information. Security computer 112 uses this information to determine, from a list of preassigned telephone numbers, the location of the calling party at communication device T100. Security computer 112 through security device 120 disconnects communication device T100 from the call connection and initiates a return data call to the calling party using the preassigned telephone number from the list stored in security computer 112. Security computer 112 completes this call connection via associated security device 120 to communication device T100 associated with the calling party and then initiates a data call transfer operation to connect the calling party to the designated protected computer facility (computer A). The data call transfer operation is accomplished by security device 120 signaling switch processor 101 over bus 105 using standard telephone station set data call transfer button push signals. If the calling party is not at a preassigned telephone number, yet is permitted access to a protected computer facility, an alternative method of operation is to bypass the callback operation and simply transfer the call to the protected computer facility.

CALL CONNECTION OPERATION

In order to more fully understand the operation of adjunct processor 104 in providing computer facility access security, a simple call connection operation will be described. FIG. 2 illustrates, in flow diagram form, the steps required to interconnect a calling party to a protected computer facility. Assume for the purpose of this discussion, that a calling party at telephone station set T1OO goes off hook and dials the telephone number associated with computer A (step 201). The digits dialed by the calling party at telephone station set T100 are carried via port circuit L100 to switch processor 101 via bus 105. Switch processor 101, in response to the dialed digits, identifies (step 202) the called number as one of the protected computer ports 130-13n associated with computer A. The identification operation can be as simple as recognizing a unique class of service assigned to a protected computer port. Switch processor 101 responds to a calling party attempt to access a protected computer port by activating switching network 102 to connect (step 203) the calling party (telephone station set T1OO) to one of security devices (e.g., 120) associated with security computer 112. (Alternatively, the calling party can directly dial (step 200) the access number of adjunct processor 104). Security device 120 signals (step 204) security computer 112 that a calling party is connected via switching network 102 to security device 120. In addition, switch processor 101 transmits (step 204) control messages in the form of ISDN messages or digital telephone station set display messages over bus 105 to security computer 112 to identify the calling party and the protected computer port, via security device 120 to which the calling party T100 is now connected.

LOGIN/PASSWORD PROMPTS

Security computer 112 now performs the calling party screening function. Security computer 112, via security device 120, transmits (step 205) a prerecorded prompt message to the calling party at telephone station set T100 connected via switching network 102 to security device 120. Security device 120, in well known fashion, cues the calling party at telephone station set T100 to enter (step 206) preliminary login/password identification information to uniquely identify the calling party. In addition, security device may prompt the calling party to enter the telephone number of the computer to which the calling party is requesting access. This step is necessary in the case where the calling party directly dials adjunct processor 104. Security device 120 forwards (step 207) this identification indicia to security computer 112 for further processing. Security computer 112 contains in its memory a list of all authorized calling parties, their associated logins/passwords, telephone numbers and voiceprints. These telephone numbers can either be on premise extension numbers such as telephone station set T100 or these telephone numbers can be off premise direct dial numbers in the case where a calling party accesses a computer facility by way of one of trunk circuits 150-151. In either case, security computer 112 scans (step 208) the list of authorized users using the identification indicia obtained from the calling party by security device 120.

In the case where no match occurs between the retrieved identification information and the list stored on security computer 112, security computer 112 signals (step 211) security device 120 to disconnect the calling party's telephone station set T100 from the call connection and to terminate call processing. In the case where there is a match between the identification of the calling party and the list stored in the memory of security computer 112, security computer 112 returns to step 205.

VOICEPRINT PROMPT

Security computer activates (step 205) security device 120 to provide a prerecorded prompt message to the calling party at telephone station set T1OO. The calling party provides (step 206) a predefined voice response to match the stored voiceprint. Security device 120 transmits the received voice response to security computer 112 which compares the stored voiceprint with the response of the calling party to determine the quality of the measured match. Security computer 112 signals (step 211) security device 120 to terminate the call if no match occurs.

CALLBACK AND TRANSFER

If a match does occur, security computer 112 causes security device 120 to disconnect (step 209) the calling party's telephone station set T100 from the call connection and to immediately initiate an outgoing data call from security device 120 to the predetermined telephone number associated with the calling party as retrieved from the list stored in security computer 112. In the case presently under consideration, security device 120 dials the telephone number of the calling party at telephone station set T100. Switch processor 101 responds to the dialing of security device 120 and establishes a data call connection through switching network 102 from security device 120 via port circuit L100 to telephone station set T100. Upon completion of this call connection, security computer 112 initiates (step 210) a data call transfer operation to transfer the data call connection of calling party at telephone station set T100 from security device 120 to one of the protected computer ports 130-13m associated with computer A. Alternatively, if the calling party is not at a preassigned telephone number, security computer 112 can bypass the callback operation (step 209). This is accomplished by security computer 112 transmitting ISDN control messages or data call transfer button push signals to switch processor 101 via security device 120 and scan bus 105 to indicate a request for a data call transfer operation. Switch processor 101 responds to these control messages by enabling switching network 102 to disconnect the calling party call connection from telephone station set T100 and port circuit L100 to security device 120 and to establish a new data call connection through switching network 102 from port circuit L100 to one of the protected computer ports (e.g., 130) associated with computer A. In this fashion, the calling party at telephone station set T100 is now connected via port circuit L100 and switching network 102 to computer port 130 associated with computer A.

TRUNK CALL

The above description illustrates the method of operation of adjunct processor 104 in providing computer port access protection. The above description is illustrative of the philosophy of this invention and it is obvious that the calling party can access a protected computer port either from one of telephone station sets T100-Tn or from a remote location over any one of trunk circuits 150-151. It is also obvious that although mainframe computers such as computer A and computer B each having a plurality of computer ports, were illustrated in FIG. 1, the operation of adjunct processor 104 also applies to the case where the computer port to be protected is a personal computer associated with the telephone station set and connected to switching network 102 via a port circuit.

It is important to note that in the case of user access via a trunk circuit, there can be the need for a modem interconnection. If the incoming trunk circuit (e.g., 150) is an analog trunk, switch processor 101 signals switching network 102 to connect trunk circuit 150 to the communication leads C161 associated with modem 161 to convert the analog signals received from trunk circuit 150 to digital signals. Trunk Data Module (TDM) 160 is connected to modem 161 and serves to connect the digital signal output leads 162 of modem 161 to switching network 102. TDM 160 also interconnects switch processor 101 (via bus 105) and modem 161 to provide various control functions such as: speed setting, select originate/answer mode, hold trunk connection during data call transfer. TDM 160 is connected as a digital endpoint through switching network 102 to adjunct processor 104 and the computer facility as described above for the case of a user access from a port circuit.

While a specific embodiment of the invention has been disclosed, variations in structural detail, within the scope of the appended claims, are possible and are contemplated. There is no intention of limitation to what is contained in the abstract or the exact disclosure as herein presented. The above-described arrangements are only illustrative of the application of the principles of the invention. Normally, other arrangements may be devised by those skilled in the art without departing from the spirit and the scope of the invention.

What is claimed is:

1. In a business communication system which serves a plurality of communication devices, each of which is connected by an associated port circuit to a switching network of said business communication system, and a plurality of computer facilities, each of which is connected to said switching network by one or more computer port circuits, said switching network having a plurality of ports, a method of providing computer port access security comprising the steps of:
    interdicting all calls from any calling one of said communication devices to any of said plurality of computer facilities;
    in response to a call request from said calling communication device, said call request defining one of said plurality of computer facilities, establishing a digital call connection from said calling communication device through said switching network to an adjunct processor connected to a first one of said plurality of ports of said switching network;
    confirming the identity of the user at said calling communication device in said adjunct processor by exchanging information between said user and said adjunct processor;
    disconnecting said calling communication device from said adjunct processor;
    originating a new digital call connection from said adjunct processor to a preassigned telephone number associated with said user;
    determining, by said adjunct processor, the one of said plurality of computer facilities defined by said call request; and
    effecting, by said adjunct processor, data call transfer of said new digital call connection from said first port of said switching network connected to said adjunct processor, to a second one of said plurality of ports of said switching network, said second port being connected to one of said computer port circuits associated with one of said plurality of computer facilities determined by said adjunct processor.

2. In a business communication system which serves a plurality of communication devices, each of which is connected by an associated port circuit to a switching network of said business communication system, and a plurality of computer facilities, each of which is connected to said switching network by one or more computer port circuits, said switching network having a plurality of ports, a method of providing computer port access security comprising the steps of:
    interdicting all calls from any calling one of said communication devices to any of said plurality of computer facilities;
    in response to a call request from said calling communication device, said call request defining one of said plurality of computer facilities, establishing a digital call connection from said calling communication device through said switching network to an adjunct processor connected to a first one of said plurality of ports of said switching network;

confirming the identity of the user at said calling communication device in said adjunct processor by exchanging information between said user and said adjunct processor;

determining, by said adjunct processor, the one of said plurality of computer facilities defined by said call request; and effecting, by said adjunct processor, data call transfer of said digital call connection from said first port of said switching network connected to said adjunct processor, to a second one of said plurality of ports of said switching network, said second port being connected to one of said computer port circuits associated with said one of said plurality of computer facilities determined by said adjunct processor.

3. The method of claims 1 or 2 wherein the step of interdicting includes the steps of:

comparing the number dialed by said user with a list of computer port numbers; and substituting the number of said adjunct processor for said dialed number if said dialed number matches any number of said list of computer port numbers.

4. The method of claims 1 or 2 wherein the step of confirming includes the steps of:

providing said user with a prompt to supply identification information; and comparing the response of said user to said prompt with predetermined identification information to confirm the identity of said user.

5. The method of claims 1 or 2 wherein the step of confirming includes the steps of:

providing said user with a prompt to supply identification information;

comparing the user response to said prompt with predetermined identification information;

transmitting a second prompt to said user to supply a voice response; and measuring said user voice response with a prerecorded voiceprint from said user to verify the identity of said user.

6. In a business communication system which serves a plurality of communication devices, each of which is connected by an associated port circuit to a switching network of said business communication system, and a plurality of computer facilities, each of which is connected to said switching network by one or more computer port circuits, said switching network having a plurality of ports, a method of providing computer port access security comprising the steps of:

connecting a user originating a call from any one of said communication devices via a digital call connection through said switching network to an adjunct processor connected to a first one of said plurality of ports of said switching network in response to said user dialing the access code of said adjunct processor;

confirming the identity of said user at said calling communication device in said adjunct processor by exchanging information between said user and said adjunct processor;

obtaining from said user at said calling communication device an identification of one of said plurality of computer facilities;

disconnecting said calling communication device from said adjunct processor;

originating a new digital call connection from said adjunct processor to a preassigned telephone number associated with said user;

determining, by said adjunct processor, the one of said plurality of computer facilities identified by said identification obtained from user; and effecting, by said adjunct processor, data call transfer of said new digital call connection from said first port of said switching network connected to said adjunct processor, to a second one of said plurality of ports of said switching network, said second port being connected to one of said computer port circuits associated with said one of said plurality of computer facilities determined by said adjunct processor.

7. In a business communication system which serves a plurality of communication devices, each of which is connected by an associated port circuit to a switching network of said business communication system, and a plurality of computer facilities, each of which is connected to said switching network by one or more computer port circuits, said switching network having a plurality of ports, a method of providing computer port access security comprising the steps of:

connecting a user originating a call from any one of said communication devices via a digital call connection through said switching network to an adjunct processor connected to a first one of said plurality of ports of said switching network in response to said user dialing the access code of said adjunct processor;

confirming the identity of said user at said calling communication device in said adjunct processor by exchanging information between said user and said adjunct processor;

obtaining from said user at said calling communication device an identification one of said plurality of computer facilities;

determining, by said adjunct processor, the one of said plurality of computer facilities identified by said identification obtained from said user; and effecting, by said adjunct processor, data call transfer of said digital call connection from said first port of said switching network connected to said adjunct processor, to a second one of said plurality of ports of said switching network, said second port being connected to one of said computer port circuits associated with said one of said plurality of computer facilities determined by said adjunct processor.

8. The method of claims 6 or 7 wherein the step of confirming includes the steps of:

providing said user with a prompt to supply identification information; and comparing said user's response to said prompt with predetermined identification information.

9. The method of claims 6 or 7 wherein the step of confirming includes the steps of:

providing said user with a prompt to supply identification information;

comparing said user's response to said prompt with predetermined identification information;

transmitting a second prompt to said user to supply a voice response; and measuring said user's voice response with a prerecorded voiceprint from said user to verify the identity of said user.

10. In a business communication system which serves a plurality of communication devices, each of which is connected by an associated port circuit to a switching network of said business communication system, and a plurality of computer facilities, each of which is connected to said switching network by one or more computer port circuits, said switching network having a plurality of ports, a computer port access security arrangement comprising:

adjunct processor means connected to a first one of said plurality of ports of said switching network and responsive to a user being connected through said switching network to said adjunct processor means for confirming the identity of said user and obtaining from said user an identification of one of said plurality of computer facilities; and means responsive to the confirmation of the identity of said user by said adjunct processor means and to the obtaining of said identification of said one of said plurality of computer facilities by said adjunct processor means for effecting data call transfer of said user to a second one of said plurality of ports of said switching network, said second port being connected to one of said computer port circuits associated with said identified one of said computer facilities.

11. In a business communication system which serves a plurality of communication devices, each of which is connected by an associated port circuit to a switching network of said business communication system, and a plurality of computer facilities, each of which is connected to said switching network by one or more computer port circuits, said switching network having a plurality of ports, a computer port security arrangement comprising:

means, responsive to a user at any one of said communication devices originating a call to one of said plurality-of-computer facilities identified by a call request for said call, for interdicting said call;

means responsive to said interdicting means for establishing a digital call connection from said one communication device through said switching network to an adjunct processor connected to a first one of said plurality of ports of said switching network;

wherein said adjunct processor includes:

means responsive to information transmitted by said user to said adjunct processor over said connection to said adjunct processor for confirming the identity of said user;

means responsive to a positive identification of said user by said confirming means for disconnecting said one communication device from said adjunct processor;

means responsive to said disconnecting means for originating a new digital call connection through said switching network from said adjunct processor to a preassigned number associated with said user;

means responsive to said interdicting means for determining the one of said plurality of computer facilities identified by said call request; and means responsive to said new call connection and to said determining means for effecting data call transfer of said new digital call connection from said first port of said switching network connected to said adjunct processor, to a second one of said plurality of ports of said switching network, said second port being connected to one of said computer port circuits associated with said one of said plurality of computer facilities determined by said determining means.

12. In a business communication system which serves a plurality of communication devices, each of which is connected by an associated port circuit to a switching network of said switching system, and a plurality of computer facilities, each of which is connected to said switching network by one or more computer port circuits, said switching network having a plurality of ports, apparatus for providing computer port access security comprising:

means, responsive to a user at any one of said communication devices originating a call to one of said plurality of computer facilities identified by a call request for said call, for interdicting said call;

means responsive to said interdicting means for establishing a digital call connection from said one communication device through said switching network to an adjunct processor connected to a first one of said plurality of ports of said switching network;

wherein said adjunct processor includes:

means responsive to information transmitted by said user to said adjunct processor over said digital call connection to said adjunct processor for confirming the identity of said user;

means responsive to said interdicting means for determining the one of said plurality of computer facilities identified by said call request; and means responsive to a positive identification of said user by said confirming means and to said determining means for effecting data call transfer of said digital call connection to said one communication device, to a second one of said plurality of ports of said switching network, said second port being connected to one of said computer port circuits associated with said one of said plurality of computer facilities determined by said determining means.

13. The system of claims 11 or 12 wherein said confirming means includes:

means for performing voiceprint identification of said user.

14. The system of claims 11 or 12 wherein said interdicting means includes:

means for transmitting the computer facility number dialed by said user to said adjunct processor.

* * * * *

UNITED STATES PATENT AND TRADEMARK OFFICE
CERTIFICATE OF CORRECTION

PATENT NO. : 4,876,717

DATED : October 24, 1989

INVENTOR(S) : Salvador Barron, James E. Coffman

It is certified that error appears in the above-identified patent and that said Letters Patent is hereby corrected as shown below:

IN THE CLAIMS

Column 8, line 47, "with one" should be "with said one";
Column 10, line 38, "identification one of" should be "identification of one of".

Signed and Sealed this

Twenty-fourth Day of September, 1991

Attest:

HARRY F. MANBECK, JR.

Attesting Officer

Commissioner of Patents and Trademarks